United States Patent [19]
Cuevas

[11] Patent Number: 5,536,039
[45] Date of Patent: Jul. 16, 1996

[54] AIR BAG INFLATOR

[75] Inventor: Jess A. Cuevas, Scottsdale, Ariz.

[73] Assignee: TRW Inc., Lyndhurst, Ohio

[21] Appl. No.: 349,831

[22] Filed: Dec. 6, 1994

[51] Int. Cl.⁶ .................................................. B60R 21/26
[52] U.S. Cl. ................... 280/737; 280/740; 222/5
[58] Field of Search ..................... 280/737, 736, 280/740, 741, 742; 222/5, 3; 137/68.2, 68.13

[56]     References Cited

U.S. PATENT DOCUMENTS

| | | | |
|---|---|---|---|
| 3,797,853 | 3/1974 | Grosch et al. | 280/740 |
| 3,960,390 | 6/1976 | Goetz | 280/737 |
| 5,114,179 | 5/1992 | Emery et al. | 280/741 |
| 5,184,846 | 2/1993 | Goetz | 280/736 |
| 5,226,668 | 7/1993 | Delonge-Immik et al. | 280/737 |
| 5,301,978 | 4/1994 | Munzel et al. | 280/737 |
| 5,378,018 | 1/1995 | Ketterer et al. | 280/737 |

FOREIGN PATENT DOCUMENTS

| | | | |
|---|---|---|---|
| 2443267 | 3/1975 | Germany | 280/741 |
| 2274089 | 7/1994 | United Kingdom | 280/736 |
| 9111347 | 8/1991 | WIPO | 280/736 |

*Primary Examiner*—Brian L. Johnson
*Assistant Examiner*—Peter C. English
*Attorney, Agent, or Firm*—Tarolli, Sundheim, Covell, Tummino & Szabo

[57]     ABSTRACT

An inflator (10) includes a piston (136) which is welded in a housing (40). The piston (136) has a single circular stress riser (192). A diffuser portion (190) of the piston (136) has an outer surface (214) disposed in a plane of an end wall (54) of the housing (40). Upon actuation of the inflator (10), ignitable material (220) ignites in a combustion chamber (156) in the piston (136). The pressure increases in the combustion chamber until the stress riser (192) on the piston (136) ruptures. The diffuser portion (190) of the piston (136) separates from a mounting portion (180) and moves to a position out of the plane of the end wall (54).

21 Claims, 3 Drawing Sheets

AIR BAG INFLATOR

BACKGROUND OF THE INVENTION

1. Technical Field

The present invention relates to a vehicle safety apparatus including an inflatable vehicle occupant restraint, and particularly relates to an air bag inflator for inflating an air bag to restrain a vehicle occupant.

2. Description of the Prior Art

It is known to protect a vehicle occupant by an air bag that is inflated in the event of sudden vehicle deceleration, such as occurs in a vehicle collision. The air bag restrains movement of the vehicle occupant during the collision. The air bag is inflated by inflation fluid from an air bag inflator. The inflation fluid from the inflator may be directed by a diffuser into the air bag to inflate the air bag. The diffuser may be a portion of the inflator or may be an element separate from the inflator.

SUMMARY OF THE INVENTION

The present invention is an apparatus for inflating an inflatable vehicle occupant restraint. The apparatus includes a housing including walls which encircle an axis and which define a stored gas chamber containing stored gas for inflating the inflatable restraint. An end wall of the housing includes a radially extending generally planar portion and an outlet opening through which gas can flow from the stored gas chamber. A piston connected with the housing closes the outlet opening to block flow of gas from the stored gas chamber through the outlet opening. The piston includes a diffuser portion having an unactuated position in which an outer surface of the diffuser portion is disposed in the plane of the end wall. The piston includes a ring-shaped mounting portion having a circular outer periphery welded to the walls of the housing. The mounting portion of the piston has a stress riser and is rupturable at the stress riser. The diffuser portion of the piston is supported on the walls for axial movement relative to the mounting portion upon rupturing of the mounting portion of the stress riser. An ignitable material chamber is located radially inward of the stored gas chamber, and an igniter is disposed in the ignitable material chamber. An ignitable material in the ignitable material chamber is ignitable upon actuation of the igniter to produce combustion products including heat for heating and pressurizing the stored gas in the stored gas chamber. The mounting portion of the piston is rupturable at the stress riser in response to actuation of the igniter and ignition of the ignitable material. The diffuser portion moves from the unactuated position to an actuated position in which the diffuser portion outer surface is disposed axially outward of the plane of the end wall portion. In the preferred embodiment, the piston has a single circular stress riser which comprises the stress riser in the mounting portion of the piston.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT OF THE INVENTION

Figure 1:
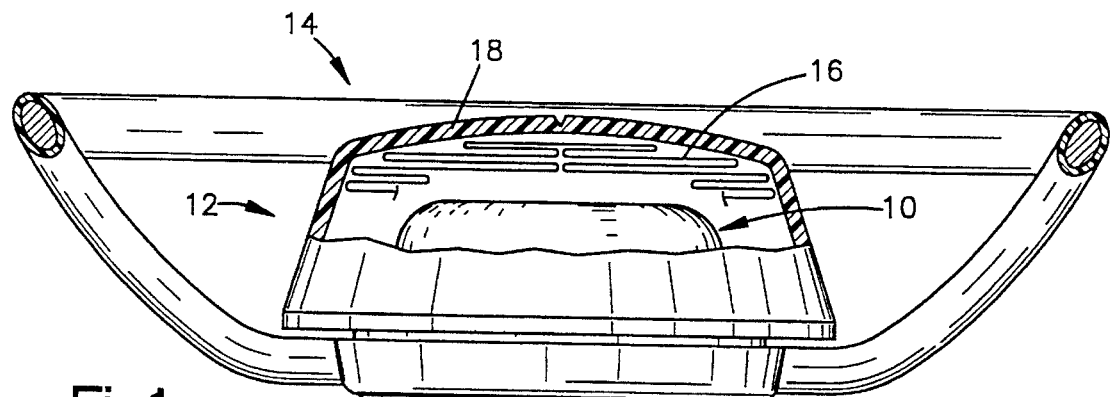
FIG. 1 is a schematic sectional view of a vehicle steering wheel assembly including an air bag module having an inflator constructed in accordance with the present invention.

The present invention relates to an apparatus for inflating an inflatable vehicle occupant restraint and, particularly, to an inflator for inflating an air bag to protect the driver of a vehicle. The present invention is applicable to various air bag inflator constructions. As representative of the present invention, FIG. 1 illustrates an inflator 10.

The inflator 10 is included in an air bag module 12 which is mounted at the center of a vehicle steering wheel 14. The air bag module 12 also includes an inflatable air bag 16 which is folded and stored with the inflator 10 inside a cover 18.

As shown schematically in FIG. 1, a portion 30 of the vehicle electric circuitry includes a power source 32, such as the vehicle battery, and a normally open switch 34. The switch 34 is part of a deceleration sensor 36. The switch 34 closes upon the occurrence of a predetermined amount of vehicle deceleration indicative of a collision. When the switch 34 closes, electric current passes through lead wires 38 to actuate the inflator 10 in a manner described below.

The inflator 10 (FIGS. 2–5) includes a housing 40. The housing 40 includes a drawn stainless steel shell 50 which extends as a ring around a central axis 52 of the inflator 10. The shell 50 has a C-shaped radial section which is open at the radially inner side of the radial section. The shell 50 includes a radially extending generally planar upper wall 54 having a planar outer major side surface 56. An annular edge portion 58 (FIG. 5) of the upper wall 54 defines a circular upper opening in the shell 50. The shell 50 also includes a radially extending generally planar lower wall 62 having planar inner and outer major side surfaces 64 and 66 and an annular edge portion 68.

Figure 4:
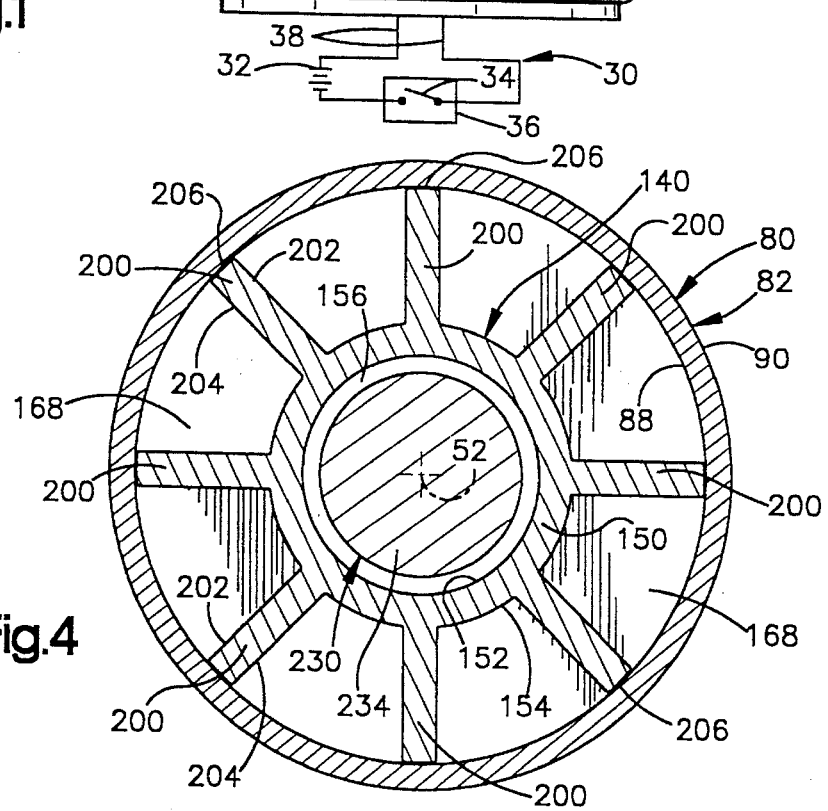
FIG. 4 is a sectional view taken along line 4—4 of FIG. 2 with parts removed.
Figure 5:
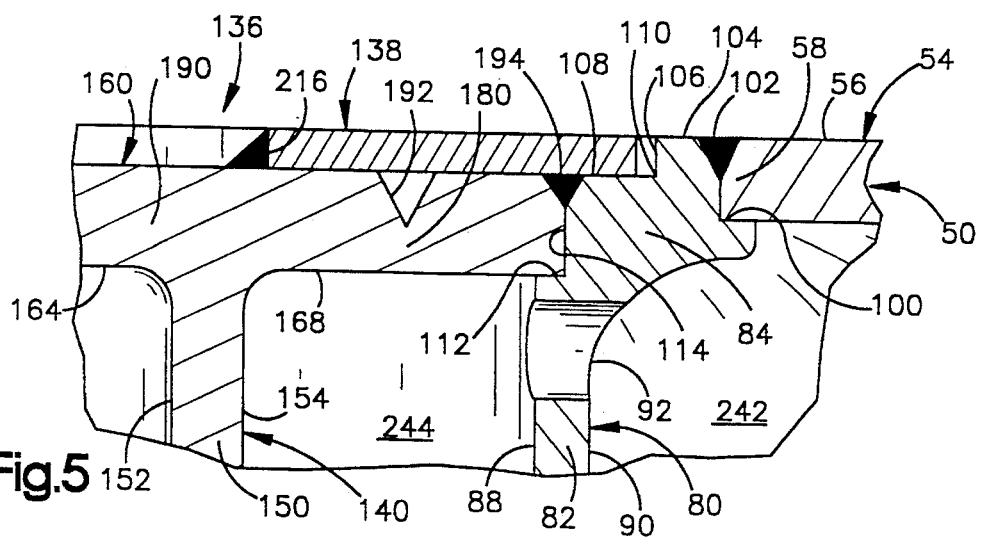
FIG. 5 is an enlarged view of a portion of FIG. 2.
Figure 2:
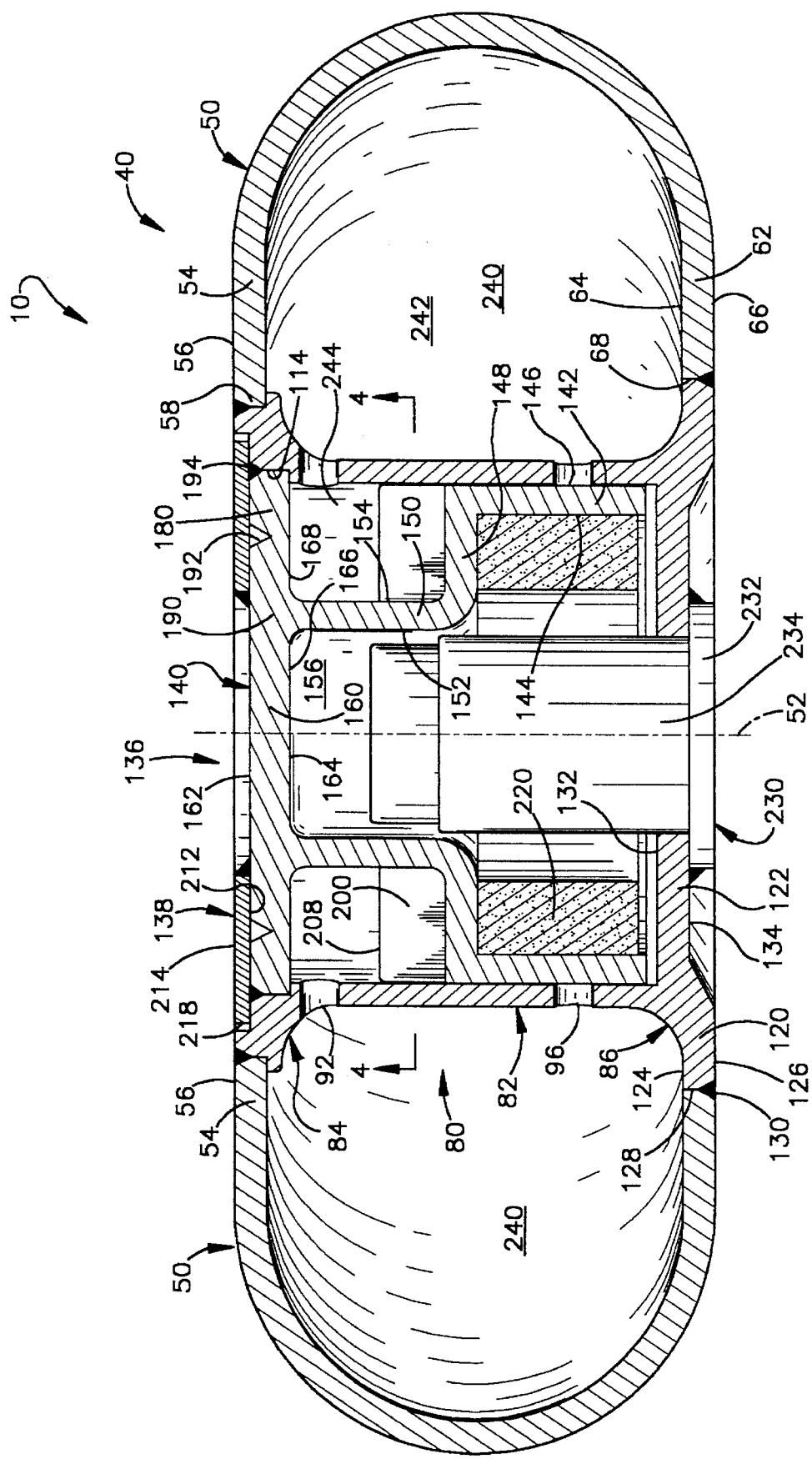
FIG. 2 is a sectional view of the inflator of FIG. 1 shown in an unactuated condition.

The housing 40 also includes a center member 80 (FIGS. 2, 4 and 5). The center member 80 is a one-piece forging and includes an axially extending cylindrical side wall 82, an upper end portion 84, and a lower end portion 86. The side wall 82 has cylindrical inner and outer surfaces 88 and 90 (FIG. 5) which extend parallel to the axis 52. Two axially spaced apart, circular arrays of gas flow openings 92 and 96 are formed in the side wall 82.

The upper end portion 84 of the center member 80 includes surfaces defining a radially outward facing first shoulder 100 in which the edge portion 58 of the upper wall 54 of the shell 50 is received. The edge portion 58 of the shell 50 is welded to the upper end portion 84 of the center member 80 at a continuous circular weld location 102.

A planar outer surface 104 (FIG. 5) of the center member 80 extends radially between the weld location 102 and a cylindrical axially extending surface 106 of the center member 80. The cylindrical surface 106 and an annular radially extending surface 108 on the center member 80 define a radially inward facing second shoulder 110 located in the upper end portion 84 of the center member radially inward of the surface 104. A radially inward facing third shoulder 112 is formed in the center member 80 at the upper end of the cylindrical inner side surface 88 of the side wall 82. The third shoulder 112 of the center member 80 is located radially inward and axially below the second shoulder 110 and defines a circular outlet opening 114 in the housing 40.

The lower end portion 86 (FIG. 2) of the center member 80 includes an outer section 120 which projects radially outward from the side wall 82 and an inner section 122 which projects radially inward from the side wall. The outer section 120 has an inner side surface 124 and a planar outer side surface 126. An edge portion 128 of the outer section 120 is welded to the lower wall 62 of the shell 50 at a continuous circular weld location 130.

The inflator 10 includes a piston 136 (FIGS. 2, 4 and 5). In the preferred embodiment, the piston 136 has a two part construction including a diffuser plate 138 and a main piston member 140. The piston 136 could have a different construction, as described below.

The main piston member 140 (FIG. 2) is a one-piece forging and includes a cylindrical outer side wall 142 with parallel axially extending inner and outer surfaces 144 and 146. A ring-shaped intermediate wall 148 of the piston extends radially inward from the upper end portion of the outer side wall 142. A cylindrical inner side wall 150 of the main piston member 140 extends axially from the radially inner end of the intermediate wall 148. The inner side wall 150 has parallel axially extending inner and outer surfaces 152 and 154.

The walls 142, 148 and 150 partially define a combustion chamber 156 inside the piston 136. The combustion chamber 156 is capped by a radially extending end wall 160 of the main piston member 140 which is formed as one piece with the side walls 142 and 150 and the intermediate wall 148. The end wall 160 has parallel radially extending outer and inner side surfaces 162 and 164. The outer side surface 162 of the end wall 160 is planar and is circular in configuration. A first portion 166 of the inner side surface 164 is circular in configuration and is disposed radially inward of the inner side wall 150. A second portion 168 of the inner side surface 164 has a ring-shaped configuration and is disposed radially outward of the inner side wall 150.

Figure 3:
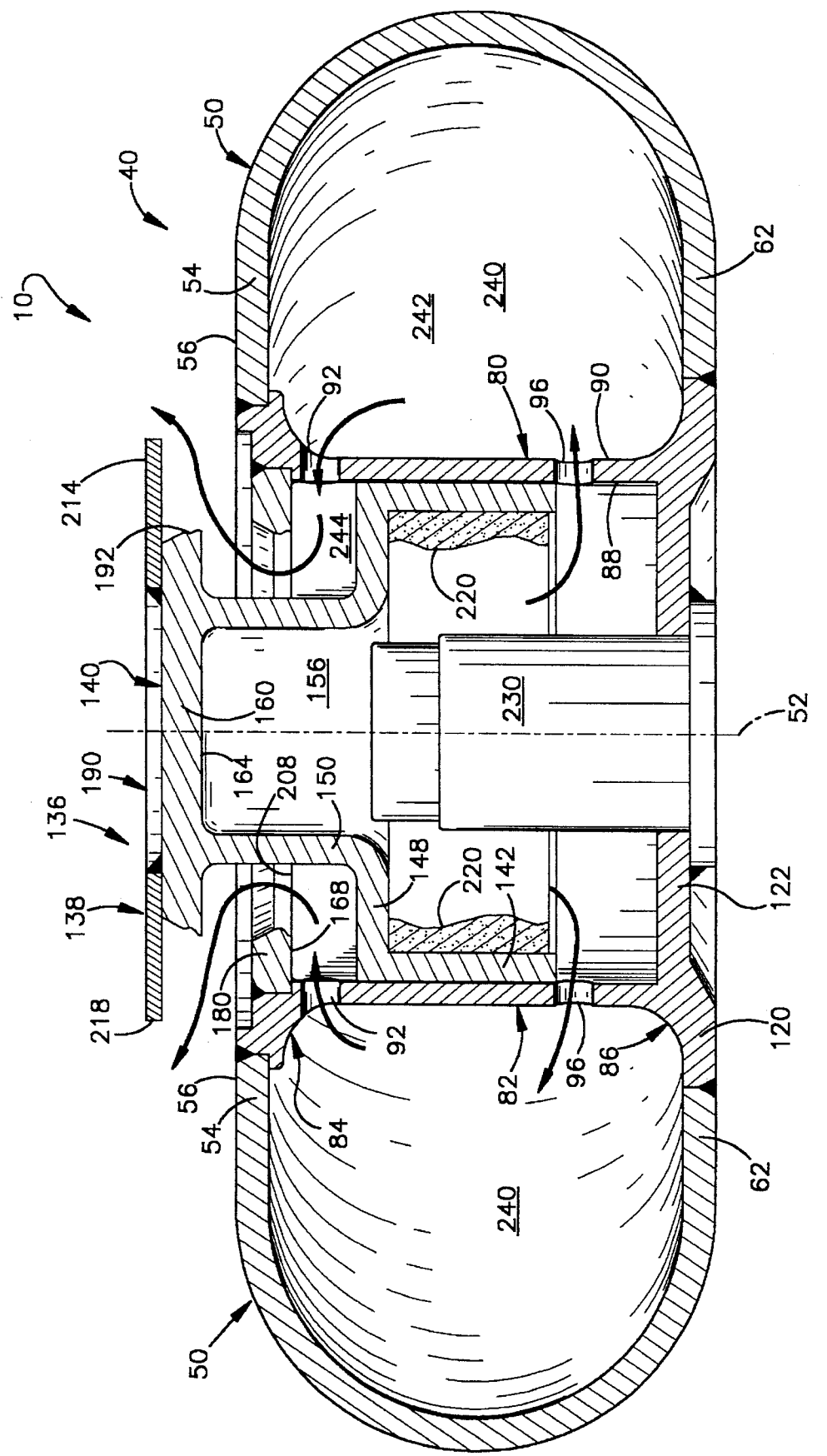
FIG. 3 is a view similar to FIG. 2 showing the inflator of FIG. 1 in an actuated condition.

The main piston member 140 includes a plurality of fins 200 (FIGS. 2 and 4) which extend radially outward from the inner side wall 150 and axially upward from the intermediate wall 148. Each fin 200 has planar, axially extending opposite side surfaces 202 and 204 and an outer edge surface 206. Each fin 200 has a radially extending upper end surface 208 (FIGS. 2 and 3).

The main piston member 140 includes a single circular stress riser in the form of an annular groove 192 formed on the outer side surface 162 of the end wall 160. The groove 192 has a V-shaped cross-sectional configuration and extends in a circular configuration centered on the axis 52.

The ring-shaped portion of the end wall 160 which is disposed radially outward of the groove 192 forms a mounting portion 180 (FIGS. 2 and 5) of the piston 136. The mounting portion 180 is received in the third shoulder 112 in the upper end portion 84 of the center member 80. The mounting portion 180 is welded at a continuous circular weld location 194 to the upper end portion 84 of the center member 80 to close the outlet opening 114 in the housing 40.

The circular portion of the end wall 160 of the main piston member 140 which is disposed radially inward of the groove 192 forms a first part of a diffuser portion 190 of the piston 136. The diffuser portion 190 is connected for movement with the inner side wall 150, the intermediate wall 148 and the outer side wall 142 of the main piston member 140.

The diffuser portion 190 of the piston 136 also includes the diffuser plate 138. The diffuser plate 138 is a ring-shaped piece of sheet metal having planar radially extending inner and outer major side surfaces 212 and 214. The outer surface 214 of the diffuser plate 138 lies in the same plane as the outer surface 56 of the upper wall 54 of the shell 50 and the outer surface 104 (FIG. 5) of the center member 80. A continuous circular weld 216 (FIG. 5) secures the diffuser plate 138 to the outer major side surface 162 of the end wall 160 of the main piston member 140, at a location radially inward of the stress riser 192. A circular outer peripheral portion 218 (FIG. 2) of the diffuser plate 138 is disposed in the second shoulder 110 of the center member 80, at a location radially outward of the stress riser 192.

A tubular body of ignitable material 220 (FIG. 2) is secured in a known manner (not shown) to the inner surface 144 of the outer side wall 142 of the main piston member 140. The body of ignitable material 220 is disposed in the combustion chamber 156. A suitable material for the body of ignitable material 220 has the following composition:

| % By Weight | Ingredient |
| --- | --- |
| 73% | Potassium perchlorate |
| 8.7% | Dioctyl adipate |
| 6.6% | Polyvinyl chloride |
| 0.05% | Carbon Black |
| 0.15% | Stabilizers (Boron, Chromium) |
| 11.5% | Potassium nitrate |

Alternatively, the body of ignitable material 220 could have any other suitable composition known in the art.

The inflator 10 further includes a known initiator 230. A mounting flange 232 of the initiator 230 is welded to the inner section 122 of the lower end portion 86 of the center member 80. A cylindrical body portion 234 of the initiator 230 projects axially within the combustion chamber 156 in the piston 136. The lead wires 38 (FIG. 1) are connected with the initiator 230 in a manner not shown for actuation of the initiator upon closing of the switch 34.

The shell 50, the center member 80, and the piston 136 define a gas storage chamber 240 (FIG. 2) for storing inflation fluid in the form of gas under pressure in the inflator 10. A ring-shaped portion 242 of the gas storage chamber 240 is disposed radially outward of the side wall 82 of the center member 80. Another portion 244 of the gas storage chamber 240 is disposed radially inward of the side wall 82 of the center member 80. The gas storage chamber 240 is filled through a fill port (not shown) with a known inflation fluid such as argon or nitrogen under pressure.

When the inflator 10 is assembled into the air bag module 12 (FIG. 1), the electrical circuit 30 extends through the initiator 230 via the lead wires 38. When the vehicle experiences deceleration of a magnitude indicative of a collision, the switch 34 closes and an electric current passes through the initiator 230. The initiator 230 is actuated and produces combustion products which ignite the body of ignitable material 220 within the combustion chamber 156. The ignitable material 220, as it burns in the combustion chamber 156, produces further combustion products including heat. As a result, the pressure within the combustion chamber 156 increases rapidly.

The increasing pressure within the combustion chamber 156 acts forcefully in an upward direction as viewed in FIGS. 2 and 3 against the inner side surface 164 of the end wall 160 of the main piston member 140. The force of the increasing pressure ruptures the stress riser 192 of the piston 136 when the force reaches a predetermined elevated level. The rupturing of the stress riser 192 enables separation of the diffuser portion 190 of the piston 136 from the fixed mounting portion 180 of the piston.

The diffuser portion 190 of the piston 136 is thus released, as shown in FIG. 3, for movement axially upward under the influence of the force of the pressure within the combustion chamber 156. The outer side wall 142 of the main piston member 140 slides along the side wall 82 of the center member 80 and supports the diffuser portion 190 for axial movement. The force of the pressure within the combustion chamber 156 propels the diffuser portion 190 of the piston 136 from the unactuated position shown in FIG. 2 to the actuated position shown in FIG. 3.

The outer surface 214 of the diffuser plate 138 of the piston 136 moves to a position axially outward of the plane of the outer surface 56 of the upper wall 54 of the shell 50. The upper end surfaces 208 of the fins 200 on the moving portion of the piston 136 engage the section of the second portion 168 of the inner side surface 164 which is formed on the fixed portion of the piston 136. This engagement stops movement of the diffuser portion 190 of the piston 136 in the actuated position.

The movement of the diffuser portion 190 of the piston 136 to the actuated position shown in FIG. 3 uncovers the radially inner ends of the gas flow openings 96 in the center member 80. The combustion chamber 156 in the piston 136 is thus placed in fluid communication with the ring-shaped portion 242 of the gas storage chamber 240. The pressurized combustion products within the combustion chamber 156 are released to flow radially outward through the openings 96 and into the gas storage chamber 240. The heat of those combustion products then increase the temperature, pressure, and volume of the gas in the gas storage chamber 240.

A large volume of gas is rapidly directed from the gas storage chamber 240 through the upper gas flow openings 92 and through the outlet opening 114. The gas is directed radially inward against the inner side wall 150 of the main piston member 140. The flowing gas is then directed radially outward by the diffuser portion 190 of the piston 136 including the diffuser plate 138. The gas flows into the air bag 16 to inflate the air bag.

From the above description of the invention, those skilled in the art will perceive improvements, changes and modifications in the invention. For example, a piston formed as one piece can be substituted for the two-piece assembly of the diffuser plate 138 and the main piston member 140. In that case, the single circular stress riser may be formed on the inner side surface of the end wall of the piston rather than on the outer side surface. Such improvements, changes and modifications within the skill of the art are intended to be covered by the appended claims.

Having described the invention, I claim:

1. An apparatus for inflating an inflatable vehicle occupant restraint, said apparatus comprising:

a housing including walls which encircle an axis and which define a stored gas chamber containing stored gas for inflating the inflatable vehicle occupant restraint;

said housing including an end wall having a radially extending generally planar portion and having means defining an outlet opening through which gas can flow from said stored gas chamber;

a one-piece piston connected with said housing and closing said outlet opening to block gas flow from said stored gas chamber through said outlet opening;

said piston including a diffuser portion having an edge located a first distance from the axis and having an unactuated position in which an outer surface of the diffuser portion is disposed in a plane containing said planar portion of said housing end wall;

said piston including a ring-shaped mounting portion having an outer periphery welded to said walls of said housing, said mounting portion of said piston having a single stress riser located a second distance from the axis and being rupturable at said stress riser, said first distance being greater than said second distance; said diffuser portion of said piston being supported on said walls of said housing for axial movement relative to said mounting portion of said piston upon rupturing of said stress riser of said mounting portion;

means for defining an ignitable material chamber located radially inward of said stored gas chamber;

an igniter in said ignitable material chamber; and an ignitable material in said ignitable material chamber which is ignitable upon actuation of said igniter to produce combustion products including heat for heating and pressurizing said stored gas in said stored gas chamber;

said mounting portion of said piston being rupturable at said stress riser in response to actuation of said igniter and ignition of said ignitable material, and said diffuser portion moving from the unactuated position to an actuated position in which said diffuser portion outer surface is disposed axially outward of the plane containing said planar portion of said housing end wall.

2. An apparatus as set forth in claim 1 wherein said piston includes a radially extending circular end wall, a cylindrical inner side wall extending axially from said piston end wall in a direction away from said plane containing said planar portion of said housing end wall, a ring-shaped intermediate wall extending radially outward from said inner side wall, and a cylindrical outer side wall extending axially from a radially outer end portion of said intermediate wall in a direction away from said plane containing said planar portion of said housing end wall;

said cylindrical outer side wall of said piston supporting said diffuser portion on said housing walls for axial movement relative to said mounting portion upon rupturing of said stress riser.

3. An apparatus as set forth in claim 1 wherein said diffuser portion of said piston when in the actuated position projects radially outward from said stress riser to redirect gas flowing through said outlet opening.

4. An apparatus as set forth in claim 1 wherein said ring-shaped mounting portion of said piston extends around said diffuser portion of said piston, said stress riser comprising surfaces defining an annular groove encircling said diffuser portion at a location radially intermediate said diffuser portion and said mounting portion.

5. An apparatus as set forth in claim 4 comprising means for stopping movement of said diffuser portion of said piston in the actuated position, said means for stopping movement comprising a first surface on said piston movable with said diffuser portion of said piston and a second surface disposed on a fixed portion of said piston, said first surface on said piston being engageable with said second surface on said piston upon movement of said diffuser portion to the actuated position to stop movement of said diffuser portion of said piston in the actuated position.

6. An apparatus as set forth in claim 1 wherein said planar portion of said housing end wall has a planar outer surface, said outer surface of said diffuser portion of said piston comprising a planar radially extending major side surface of said piston which is co-planar with said outer surface of said housing end wall when said diffuser portion of said piston is in the unactuated position.

7. An apparatus as set forth in claim 1 wherein said means for defining an ignitable material chamber comprises (a) a first wall portion of said piston extending parallel to said outer surface of said diffuser portion of said piston at a location intermediate said ignitable material and said diffuser portion of said piston and (b) at least one second wall portion of said piston extending axially from said first wall portion and encircling said ignitable material.

8. An apparatus as set forth in claim 1 wherein said single stress riser has a circular configuration.

9. An apparatus as set forth in claim 8 wherein said single stress riser is formed in a radially extending wall portion of said piston, said stress riser defining a fixed portion of said piston at a location radially outward of said stress riser and said stress riser defining at a location radially inward of said stress riser a movable portion of said piston which is supported for sliding movement on one of said housing walls.

10. An apparatus for inflating an inflatable vehicle occupant restraint, said apparatus comprising:

a housing including walls which encircle an axis and which define a stored gas chamber containing stored gas for inflating the inflatable vehicle occupant restraint;

said housing further including an end wall having an outlet opening through which gas can flow from said stored gas chamber;

a one-piece piston connected with said housing and closing said outlet opening to block flow of gas from said stored gas chamber through said outlet opening;

said piston including a circular diffuser portion centered on the axis and having an edge located a first distance from the axis, said diffuser portion having an unactuated position in which said outlet opening is closed;

said piston including a ring-shaped mounting portion having a circular outer periphery welded to said walls of said housing;

said mounting portion of said piston having a single circular stress riser located a second distance from the axis and being rupturable at said stress riser, said first distance being greater than said second distance;

said piston having a support portion connected for movement with said diffuser portion upon rupturing of said stress riser and supporting said diffuser portion on said walls for axial movement relative to said mounting portion upon rupturing of said stress riser;

means for defining an ignitable material chamber located radially inward of said stored gas chamber;

an igniter and an ignitable material in said ignitable material chamber; and passage means in said housing for directing flow of combustion products of said ignitable material into said stored gas chamber for heating and pressurizing said stored gas in said stored gas chamber upon rupturing of said stress riser;

said mounting portion of said piston being rupturable at said stress riser in response to actuation of said igniter and ignition of said ignitable material, and said diffuser portion of said piston moving from the unactuated position to an actuated position to open said outlet opening.

11. An apparatus as set forth in claim 10 wherein said single circular stress riser comprises surfaces defining an annular groove encircling said diffuser portion of said piston.

12. An apparatus as set forth in claim 10 wherein said single stress riser is formed in a radially extending wall portion of said piston, said stress riser defining a fixed portion of said piston at a location radially outward of said stress riser and said stress riser defining at a location radially inward of said stress riser a movable portion of said piston which is supported for sliding movement on one of said housing walls.

13. An apparatus as set forth in claim 10 wherein said diffuser portion of said piston comprises a radially extending circular end wall of said piston and said piston comprises a cylindrical axially extending side wall connected for movement with said piston end wall, said side wall supporting said diffuser portion on said housing walls for axial movement relative to said mounting portion upon rupturing of said stress riser.

14. An apparatus as set forth in claim 13 wherein said passage means comprises gas flow openings which are uncovered by said side wall upon movement of said side wall with said diffuser portion of said piston.

15. An apparatus as set forth in claim 10 comprising means for stopping movement of said diffuser portion of said piston in the actuated position, said means for stopping movement comprising a first surface on said piston and movable with said diffuser portion of said piston and a second surface disposed on a fixed portion of said piston, said first surface on said piston being engageable with said second surface on said piston upon movement of said diffuser portion to the actuated position to stop movement of said diffuser portion of said piston in the actuated position.

16. An apparatus as set forth in claim 10 wherein said end wall of said housing has a radially extending generally planar portion and wherein said diffuser portion of said piston has an outer surface which is disposed in the plane of said planar portion of said end wall of said housing when said diffuser portion of said piston is in the unactuated position.

17. An apparatus as set forth in claim 16 wherein said diffuser portion of said piston comprises a planar end wall of said piston having an inner major side surface engageable by combustion products of said ignitable material to transmit force to said piston to rupture said stress riser, said end wall of said piston having an outer major side surface comprising said outer surface of said diffuser portion of said piston.

18. An apparatus as set forth in claim 10 wherein said diffuser portion of said piston when in the actuated position projects radially outward from said stress riser to redirect gas flowing through said outlet opening.

19. An apparatus for inflating an inflatable vehicle occupant restraint, said apparatus comprising:

a housing including walls which encircle an axis and which define a stored gas chamber containing stored gas for inflating the inflatable vehicle occupant restraint;

said housing including an end wall having a radially extending generally planar portion and having means defining an outlet opening through which gas can flow from said stored gas chamber;

a piston connected with said housing and closing said outlet opening to block flow of gas from said stored gas chamber through said outlet opening;

said piston including a diffuser portion movable from an unactuated position to an actuated position to open said outlet opening;

said piston including a ring-shaped mounting portion having an outer periphery welded to said walls of said housing, said mounting portion of said piston having a stress riser and being rupturable at said stress riser, said diffuser portion of said piston being supported on said walls for axial movement relative to said mounting portion upon rupturing of said stress riser of said mounting portion;

means for defining an ignitable material chamber located radially inward of said stored gas chamber;

an igniter in said ignitable material chamber; and an ignitable material in said ignitable material chamber which is ignitable upon actuation of said igniter to produce combustion products including heat for heating and pressurizing said stored gas in said stored gas chamber;

said mounting portion of said piston being rupturable at said stress riser in response to actuation of said igniter and ignition of said ignitable material, and said diffuser portion moving from the unactuated position to the actuated position to open said outlet opening;

said diffuser portion of said piston when in the actuated position projecting radially outward from said stress riser to redirect gas flowing through said outlet opening.

20. An apparatus as set forth in claim 19 wherein said stress riser has a circular configuration centered on said axis and spaced radially outward from said axis by a first radial distance, said diffuser portion of said piston having an outer peripheral portion which has a circular configuration centered on said axis and which is spaced radially outward from said axis by a second radial distance greater than said first radial distance.

21. An apparatus as set forth in claim 19 wherein said diffuser portion when in the unactuated position has an outer surface disposed in the plane of said end wall, said outer surface being disposed axially outward of the plane of said end wall when said diffuser portion is in the actuated position.

* * * * *